March 16, 1965     M. G. KLEIN     3,173,812
DEFERRED-ACTION BATTERY
Filed Feb. 27, 1961     2 Sheets-Sheet 1

INVENTOR:
MARTIN G. KLEIN
BY Irving Holtzman
ATTORNEY.

INVENTOR:
MARTIN G. KLEIN
BY
Irving Holtzman
ATTORNEY.

United States Patent Office 3,173,812
Patented Mar. 16, 1965

3,173,812
DEFERRED-ACTION BATTERY
Martin G. Klein, Bronx, N.Y., assignor to Yardney International Corp., New York, N.Y., a corporation of New York
Filed Feb. 27, 1961, Ser. No. 92,004
4 Claims. (Cl. 136—90)

This invention relates to deferred action batteries of the type designed to be activated by the introduction of electrolyte into the battery cells. More particularly, it relates to a system designed to store electrolyte in a reservoir and to deliver it to battery cells at a later time for the purpose of activating the cells, usually in response to a signal.

In many applications of deferred-action batteries, it is necessary that the activation system be operable in any position that the reservoir may assume. It has been proposed for this purpose to provide a system wherein the electrolyte reservoir contains an exit conduit whose inner opening is located at the geometric center of said reservoir. The other end of the conduit feeds electrolyte to the cells of the battery.

The chief disadvantage of this system is that, in view of the location of the conduit opening at the geometric center of the reservoir, only one half of the electrolyte contained in the reservoir could be delivered to the battery cells. After the electrolyte has dropped to the level of the conduit opening, the flow of electrolyte ceases.

It has now been found that the quantity of electrolyte delivered to the cells, in a system which is operable in any position of the reservoir, may be increased considerably by disposing inside a liquid-filled electrolyte reservoir a tubular conduit, preferably in the form of a coil, which is also filled with electrolyte. The tubular conduit is adapted to inject the electrolyte contained therein into the principal electrolyte reservoir, as a result of pressure applied to the liquid in this conduit, or into the battery cells in response to the pressure applied to this liquid through the electrolyte contained in said principal reservoir.

It has been suggested that electrolyte may be stored for delivery to a deferred-action battery in a tubular container which is wound around the battery. This system is of limited application since the quantity of electrolyte delivered is dependent on the size of the tubular container. Furthermore, the use of the tubular winding around the outside of the battery seriously limits the configuration of the battery since the tubing has to be bent to conform to the shape of the battery.

In deferred-action batteries of the type with which the present invention is concerned, it has been customary to provide a bleeder means to facilitate the escape of gases which result from the operation of the battery or which may be introduced into it by the activating system. For this purpose it has been customary to mount a bleeder vent in the manifold which distributes electrolyte to the cells. As a result of this construction, electrolyte was easily lost through the bleeder vent. According to another aspect of the present invention this disadvantage is avoided by positioning the bleeder so that gases leaving the cells pass first through a sump of electrolyte contained in the electrolyte reservoir and then through a tortuous path to the bleeder.

A common problem in conventional deferred-action batteries is the self-discharge of the activated battery via inter-cell leakage paths constituted by the static electrolyte column which extends through the manifold to the supply reservoir. In co-pending application Ser. No. 10,748, filed February 24, 1960, it has been suggested that a reactive agent capable of reacting with the electrolyte to form a gas bubble be inserted in the manifold between adjacent cells. On activation of the battery the electrolyte reacts with the agent and forms a gas bubble which acts as a block for current flowing from one cell to another. Pursuant to still another aspect of the present invention an improved construction and disposition of said reactive agent is provided.

It is accordingly an object of the present invention to provide a battery-activating system of the type described above but adapted to be used in any position of the electrolyte reservoir and, further, to deliver a maximum quantity of electrolyte from the reservoir to the battery cells.

It is also an object of the present invention to provide a battery activating system of the above-described type having an improved bleeder construction designed to minimize the loss of electrolyte.

It is still another object of the present invention to provide improved means for preventing inter-cell electric leakage in a deferred-action battery of the type referred to above.

Other and more detailed objects will be apparent from the following description and wherein.

Figure 2:
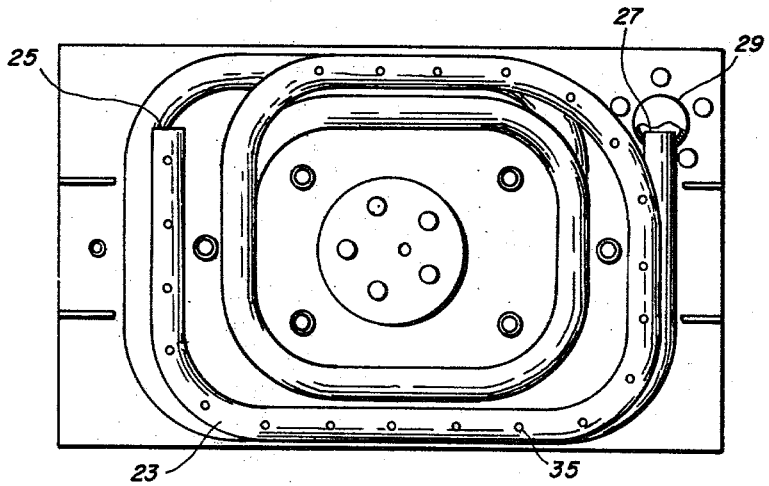
FIG. 2 is a top-plan view of the device shown in FIG. 1, the top of the housing shown therein removed to expose the internal structure.
Figure 1:
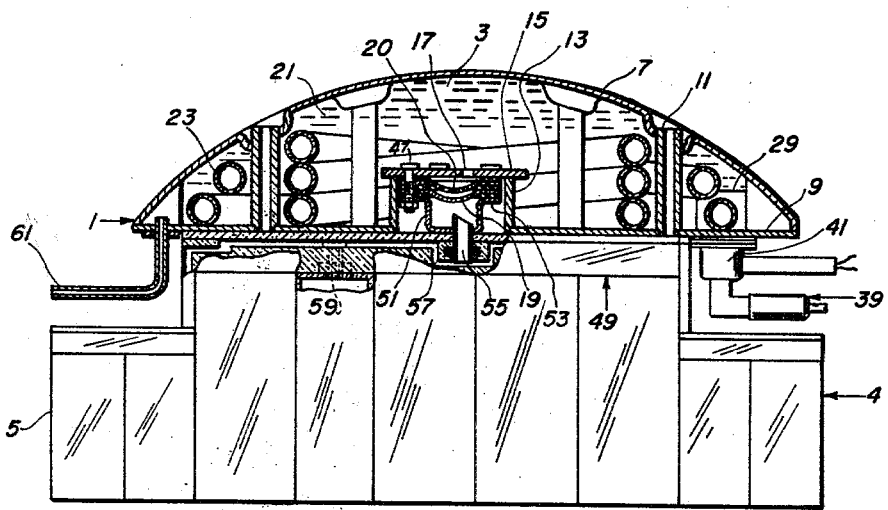
FIG. 1 is a partial cross-sectional view of a battery and activating system embodying the present invention.

As shown in the drawing wherein like numerals designate the same parts in the various views, 1 indicates the activator of a deferred-action battery 4, the activator consisting of an electrolyte reservoir 3 atop a monoblock 5 containing the battery cells.

Reservoir 3, made of any suitable material inert to the electrolyte is constructed with a dome-like roof 7, a flat base 9, and a plurality of hollow supporting columns 11 which insure the rigidity of the structure. Extending upwardly from base 9 is boss 13 provided with a top closure 15. A hole 17 is a bored through closure 15 and is located at about the geometric center of reservoir 3. A rupturable diaphragm 19 and a perforated diaphragm support 20 are secured to the underside of closure 15 and serve to block the flow of electrolyte 21 from said electrolyte reservoir until activation is required.

Figure 3:
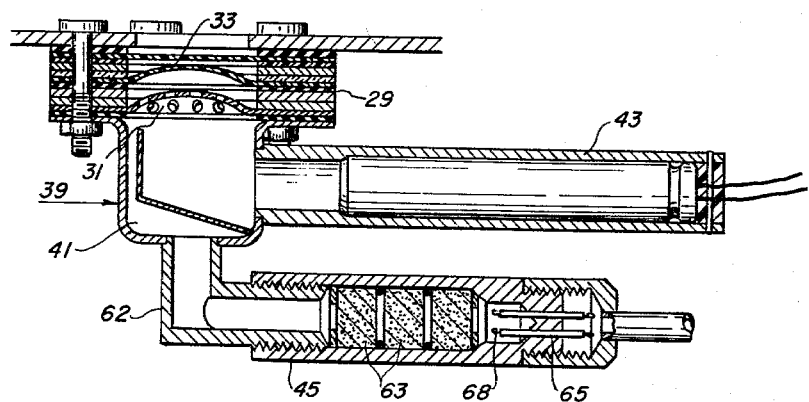
FIG. 3 is an enlarged partial cross-sectional view of a gas-bleeder and gas-generator system as shown in FIG. 1.

Disposed inside reservoir 3 and immersed in electrolyte 21 is a coiled tubing 23 having a closed end 25, which is preferably welded, and an open end 27 which terminates in a vestibule 29. The floor of vestibule 29, as best seen in FIG. 3, is formed of a second perforated diaphragm support 31 and a second rupturable diaphragm 33.

Coiled tubing 23, which may be made of any suitable material resistant to the electrolyte employed in the system, is located within the electrolyte-filled reservoir 3 and is provided with a plurality of holes 35 through which that portion of the electrolyte contained in the tubing is ejected in a manner described more in detail below.

Secured to the underside of base 9 of reservoir 3, by means of bolts, is a gas generating and bleeding assembly 39. Assembly 39 comprises a second vestibule 41 to which is connected a gas generator 43 which serves to generate gas and to conduct it to vestibule 41. Also connected to vestibule 41 is a bleeder assembly 45 described in more detail below.

Secured to the underside of closure 15, by means of bolts 47 is a manifold assembly 49. This assembly comprises a central cup 51 having a lip 53, an outlet conduit 55 offset from the center of cup 51 and a common manifold conduit 57 to which are connected the cell conduits 59.

A closable tube 61 is provided for filling reservoir 3 with electrolyte.

It is to be understood that this invention is not limited to the particular disposition of the tubing within the reservoir as illustrated in the drawing. Modifications thereof may be made without departing from the spirit of this invention.

Thus, for example, the coiled tubing may be arranged so that one of its ends is positioned at the geometric center of the reservoir and the other end is connected to the battery manifold. In this case the gas used to displace the electrolyte from the reservoir is introduced into the reservoir tank. The electrolyte first displaced into the battery cells in this case is that which is contained in the tubing. This is then followed by a portion of the electrolyte contained in the principal reservoir.

In another modification of the disposition of the coiled tubing a combination of the constructions mentioned above may be employed. In this case a first section of tubing is connected to the gas-generating source, the other end of this section opening into the body of the principal electrolyte reservoir. A second section of tubing is arranged so that one end of the tubing opens at about the geometric center of the principal reservoir whereas the other end of this section is connected to the battery manifold. In the operation of this modification the gas pressure is applied to the first section and the electrolyte contained therein is ejected, resulting in an ejection of about an equal amount of electrolyte from said second section into the cells. After all the electrolyte is ejected from the first tubular section the gas then enters the main electrolyte reservoir and the pressure applied thereby ejects further electrolyte from the second section of tubing until the electrolyte level in the reservoir reaches the level of the opening of the second section of tubing at about the geometric center of the principal reservoir. The electrolyte remaining in the second tubular section is then ejected into the battery cells by the gas pressure in the reservoir.

In use the reservoir is first assembled, the coiled tubing being positioned as described above with the rupturable diaphragm closing the exit ports of the reservoir. A vacuum is drawn on the reservoir to remove the air from the reservoir and tubing. Electrolyte is then introduced into the reservoir by means of tube 61 and is drawn into the coiled tubing 23 through openings 35 while also filling reservoir 3 which surrounds the tubing. When the reservoir is filled the filling tube is closed off and the device is ready for activation.

To activate the battery, usually in response to a signal, gas is generated in generator 43. This may take the form of a powdered fuel which is ignited by an electrical current to produce gases under pressure. The gas generated ruptures diaphragm 33 and pressure is thus exerted on the electrolyte in the tubing 23. The force of the gas ejects all the liquid electrolyte in the tubing through holes 35 into the reservoir. The force of the electrolyte so ejected also ruptures diaphragm 19 and a volume of electrolyte equal to about that contained in the tubing enters the manifold assembly 49.

After the tubing has been emptied of electrolyte, the impeller gas coming out of the holes 35 in the tubing rises to the top of the reservoir 3 and the pressure exerted empties about half of the liquid electrolyte in the reservoir outside of the tubing. Furthermore, the bubbling and turbulence created by the gas pushes additional electrolyte out and, possibly, some excess gas through the manifold assembly 49 into the battery cells. As a result of this combination, which incidentally involves no moving parts, about 60-80% of the electrolyte in the reservoir can be delivered out of said reservoir. This is independent of the shape of the reservoir. These results are to be compared with prior-art devices of this character wherein only at most 50% of the electrolyte may be delivered out of the reservoir.

As previously mentioned, a feature of the present invention is the disposition of the gas bleeder in the system. The bleeder construction is best shown in FIG. 3 and comprises a conduit 62 in which are disposed a gas-filter element 63 and a pair of bleeder tubes 65 in each of which is positioned a respective bleeder wire 68.

The gas generated in the battery and excess gas introduced into the cells from the activator system leave the battery cells and rise through the sump of electrolyte that remains in the reservoir to the upper part of the reservoir above the electrolyte level after activation. These gases then enter the coiled tube 23 through openings 35 and find their way back through the tubing to vestibule 29 and then to bleeder 45. Because of this tortuous path and the baffling effect of the reservoir, little or no electrolyte escapes from the system through the bleeder.

Figure 4:
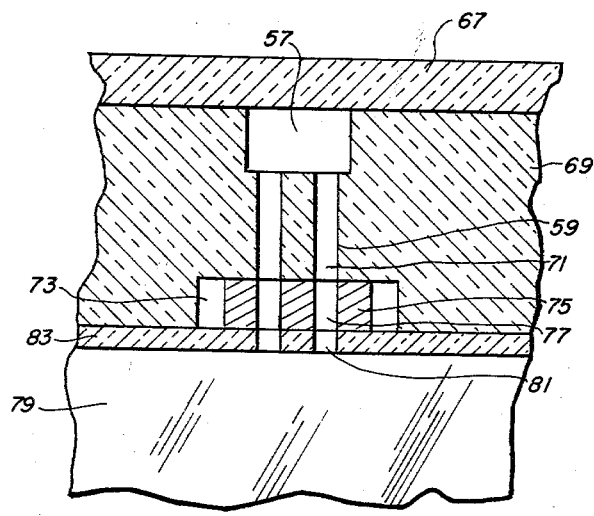
FIG. 4 is an enlarged partial cross-sectional view of the improved system for preventing inter-cell leakage.

As also previously mentioned, another feature of the present invention is an improved means for preventing inter-cell leakage in a deferred-action battery. This feature of the invention is best shown in FIG. 4.

The monoblock 5 is provided with a monoblock cover 67 under which lies a manifold block 69. The common manifold conduit 57 is machined in manifold block 69. The cell conduits 59 are also machined in manifold block 69 and are formed as a pair of channels 71 of relatively small diameter and a lower enlarged portion 73. In the preferred form of construction, channels 71 have a diameter of .045 to .047 inch.

An active-material insert 75, made preferably of aluminum and provided with a pair of bores 77 which are aligned with channels 71, is inserted in the lower enlarged portion 73 of the cell conduit 59. In this position, insert 75 is located at the entrance to cells 79. A pair of holes 81 are provided in cell cover 83 which are also aligned with channels 77 of insert 75 and channels 71 of the cell conduit 59.

In operation, when the battery is to be activated, the electrolyte is conveyed to the cell conduits 59 into channels 71 and into contact with insert 75. Electrolyte continues to flow until the cells are supplied with sufficient electrolyte. On contacting the insert 75 a reaction ensues between the electrolyte and the insert which forms gas bubbles in the channels 71. The bubbles so formed act as a barrier for the flow of current between the respective cells.

A variety of materials may be used in constructing insert 75 in accordance with the present invention. The choice of material will depend on the electrolyte used. For example, in alkaline batteries which use potassium hydroxide as electrolyte, the insert may be made of aluminum or calcium; for lead-acid batteries, the insert may be made of iron. Other materials which may be used in constructing the insert are copper-gallium alloy, zinc, nickel, cobalt, gallium and sodium amalgam. The insert may also be made partly of one metal and partly of another metal. In their preferred form the insert is made of aluminum and the electrolyte is an aqueous solution of KOH.

Numerous modifications of the described and illustrated arrangement can be made without departing from the spirit and scope of the invention, hence it is to be understood that the invention is not to be limited to the embodiment disclosed herein except as defined in the appended claims.

What is claimed is:

1. In a deferred-action battery comprising an assembly of dry cells, a rigid reservoir containing a charge of electrolyte for said cells, a manifold interconnecting said cells, said reservoir being provided with an outlet passage leading to said manifold and with an inlet passage connected to a source of impeller gas for driving said electrolyte from said reservoir through said manifold into said cells upon activation of said source, and frangible seal means in said passages confining said electrolyte to asid reservoir prior to activation of said source, the combination therewith of an elongated tube in said reservoir provided with a multiplicity of peripheral orifices and wound in several convolutions encompassing a major part of the reservoir volume, said tube containing a substantial portion of the electrolyte stored in said reservoir and being connected to said inlet passage whereby, upon activation of said source, the impeller gas must travel inside said tube and eject the electrolyte therefrom before said gas reaches said manifold.

2. In a deferred-action battery comprising an assembly of dry cells, a rigid reservoir containing a charge of electrolyte for said cells, a manifold interconnecting said cells, said reservoir being provided with a centrally disposed outlet passage leading to said manifold and with a peripherally disposed inlet passage connected to a source of impeller gas for driving said electrolyte from said reservoir through said manifold into said cells upon activation of said source, and frangible seal means in said passages confining said electrolyte to said reservoir prior to activation of said source, the combination therewith of an elongated tube in said reservoir provided with a multiplicity of peripheral orifices and wound in seceral concolutions encompassing a major part of the reservoir volume, said tube containing a substantial portion of the electrolyte stored in said reservoir and being connected to said inlet passage whereby, upon activation of said source, the impeller gas must travel inside said tube and eject the electrolyte therefrom before said gas reaches said outlet passage and said manifold.

3. In a deferred-action battery comprising an assembly of dry cells, a rigid reservoir containing a charge of electrolyte for said cells, a manifold interconnecting said cells, said reservoir being provided with an outlet passage leading to said manifold and with an inlet passage connected to a source of impeller gas for driving said electrolyte from said reservoir through said manifold into said cells upon activation of said source, and frangible seal means in said passages confining said electrolyte to said reservoir prior to activation of said source, the combination therewith of an elongated tube in said reservoir provided with a multiplicity of peripheral orifices and wound in several convolutions encompassing a major part of the reservoir volume, and bleeder means for excess gas connected with said inlet passage, said tube containing a substantial portion of the electrolyte stored in said reservoir and being connected to said inlet passage whereby, upon activation of said source, the impeller gas must travel inside said tube and eject the electrolyte therefrom before said gas reaches said manifold.

4. In a deferred-action battery comprising an assembly of dry cells, a rigid reservoir containing a charge of electrolyte for said cells, a manifold interconnecting said cells, said reservoir being provided with a centrally disposed outlet passage leading to said manifold and with a peripherally disposed inlet passage connected to a source of impeller gas for driving said electrolyte from said reservoir through said manifold into said cells upon activation of said source, and frangible seal means in said passages confining said electrolyte to said reservoir prior to activation of said source, the combination therewith of an elongated tube in said reservoir provided with a multiplicity of peripheral orifices and wound in several convolutions encompassing a major part of the reservoir volume, and bleeder means for excess gas connected with said inlet passage, said tube containing a substantial portion of the elctrolyte stored in said reservoir and being connected to said inlet passage whereby, upon activation of said source, the impeller gas must travel inside said tube and eject the electrolyte therefrom before said gas reaches said outlet passage and said manifold.

References Cited in the file of this patent

UNITED STATES PATENTS

| | | |
|---|---|---|
| 2,594,879 | Davis | Apr. 29, 1952 |
| 2,824,164 | Bauman | Feb. 18, 1958 |
| 2,914,595 | Darland | Nov. 24, 1959 |
| 3,022,364 | Chubb et al. | Feb. 20, 1962 |
| 3,102,058 | Jones | Aug. 27, 1963 |

FOREIGN PATENTS

| | | |
|---|---|---|
| 792,204 | Great Britain | Mar. 19, 1958 |